(12) United States Patent
Mills

(10) Patent No.: US 7,890,930 B2
(45) Date of Patent: Feb. 15, 2011

(54) METHOD AND SYSTEM FOR ALLOWING AN ECLIPSE FEATURE TO CREATE/REMOVE/UPDATE PROGRAM GROUPS AND SHORTCUTS, VIA AN ECLIPSE INSTALL HANDLER

(75) Inventor: William A. Mills, Woburn, MA (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 11/609,000

(22) Filed: Dec. 11, 2006

(65) Prior Publication Data

US 2008/0141241 A1 Jun. 12, 2008

(51) Int. Cl.
*G06F 9/44* (2006.01)
(52) U.S. Cl. .................... 717/124; 717/120; 717/110; 717/122
(58) Field of Classification Search .............. 717/124, 717/120
See application file for complete search history.

(56) References Cited

U.S. PATENT DOCUMENTS

| 5,966,540 | A | 10/1999 | Lister et al. |
| 6,006,034 | A | 12/1999 | Heath et al. |
| 6,363,503 | B1* | 3/2002 | Clauss et al. ............... 714/57 |
| 6,453,469 | B1 | 9/2002 | Jystad |
| 6,601,236 | B1 | 7/2003 | Curtis |
| 7,389,495 | B2* | 6/2008 | Wang et al. .................. 717/126 |
| 7,685,570 | B2* | 3/2010 | Draine et al. ................ 717/125 |
| 2003/0145317 | A1 | 7/2003 | Chamberlain |
| 2004/0003371 | A1* | 1/2004 | Coulthard et al. ........... 717/101 |
| 2004/0250175 | A1* | 12/2004 | Draine et al. .................. 714/46 |
| 2006/0288401 | A1* | 12/2006 | Wilson .......................... 726/1 |

OTHER PUBLICATIONS

Dave Springgay "Creating an Eclipse View" Nov. 2, 2001, Object Technology International Inc.*
Ed Burnette "Rich Client Tutorial Part 1" Feb. 6, 2006 Copyright 2003-2006.*
Ed Burnette "Rich Client Tutorial Part 2" Feb. 6, 2006 Copyright 2003-2006.*
Object Technology International, Inc. "Eclipse Platform Technical Overview", Feb. 2003, pp. 1-20.*
desRivieres et al. "Eclipse: A platform for integrating development tools", IBM Systems Journal, vol. 43, Issue 2, 2004, pp. 371-383.*

* cited by examiner

*Primary Examiner*—Thomas K Pham
(74) *Attorney, Agent, or Firm*—Cantor Colburn LLP; Edwin Choi

(57) ABSTRACT

A system and method for an Eclipse feature to create program groups and shortcuts is provided. The system and method include registering a global install handler and creating a properties file. The system and method also include specifying and installing at least one feature associated with the registered global install handler. Installing the feature invokes the global install handler to creating at least one shortcut and/or at least one program group associated with the properties file.

4 Claims, 3 Drawing Sheets

```xml
<?xml version="1.0" encoding="UTF-8" ?>
    <?eclipse version="3.0"?>
    - <feature id="com.ibm.workplace.links.win32.feature" label="%featureName"
    version="2.6.0" provider-name="%providerName" colocation-
    affinity="com.ibm.workplace.links.feature" os="win32" ws="win32"
    arch="x86">
        <install-handler
      handler="com.ibm.rcp.provisioning.installhandler.DesktopOperationsInstall
      Handlers" library="handlers.jar" />
        <description>%description</description>
        <copyright>%copyright</copyright>
        <license>%license</license>
    </feature>
```

FIG. 3

```
link.context=CONTEXT_DESKTOP
link.displayname=IBM Workplace Managed Client
link.iconpath=$FEATURE_DIR/icons/wp25LaunchIcon32x32x8.ico
link.target=$RCP_DIR/richclient.exe
link.args=-personality com.ibm.workplace.personality
link.workingdir=$RCP_DIR
link.scope=SCOPE_CURRENT_USER
link.windowstate=WINDOW_STATE_NORMAL
```

FIG. 4

METHOD AND SYSTEM FOR ALLOWING AN ECLIPSE FEATURE TO CREATE/REMOVE/UPDATE PROGRAM GROUPS AND SHORTCUTS, VIA AN ECLIPSE INSTALL HANDLER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates to a method, system, and program for performing program specific operations during the un-installation of a program from a computer system.

2. Description of the Related Art

An installer program is a software program that enables a programmer to write specific code to install a given application program onto the drives of a computer. The installation is conducted in a way that enables the given application program to work correctly with the computer's environment, including its operating system. There are several types of installers. For example, Java installers and operating system specific installers, (e.g., Microsoft Windows installers, and International Business Machines ("IBM") OS/2 and AIX operating system installers, etc). Many of the installer programs existing today have various limitations in their functionality as discussed below.

One type of Java installer is provided by a software company known as Install Shield. Currently, the functionality and configurability of this Java installer is somewhat limited. For example, the Java installer provides default panels, but the text cannot be changed or configured. Also, this Java installer is not easy to customize. In other words, a programmer cannot easily add a function that is not provided by the installer program. In addition, the current Java installer provides only limited registry support.

A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user. Presently, the Java installer only works with a Microsoft Windows' registry; and the support provided with Microsoft Windows is limited. For example, the current Java installer does not enable the Windows' system registry to be updated directly. Instead, the keys to update in the registry are in a file which must be imported into the registry through a system call. It would be desirable if such a Java installer program supported multiple directories, splash screens (which are images that come up while a software product is being installed), and multiple languages instead of only English. Furthermore, it would be desirable for a given installer program to be more broadly applicable to other environments and operating systems. Although Install Shields' Java installer is tailored to Java, it is also geared somewhat for the Windows' operating system as discussed above in terms of the Windows' registry support provided.

Another Java installer is called "Install Anywhere" from ZeroG. This Java installer program also has a default panel that is not configurable, (e.g., the order in which panels appear is not customizable). Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, (i.e., there is no OS/2 or AIX specific support).

Eclipse is an open source community, whose projects are focused on building an open development platform comprised of extensible frameworks, tools and runtimes for building, deploying and managing software across the lifecycle. Eclipse projects provide tools and frameworks that span the entire software development lifecycle, including modeling, development, deployment tools, reporting, data manipulation, testing and profiling. The tools and frameworks are primarily focused on building JEE, web services and web applications. Eclipse also provides support for other languages, such as C/C++, PHP, and others.

However, neither Java nor Eclipse provides an API to interact with the OS in a way which allows for the creation and removal of program groups and program shortcuts. Therefore, there exists a need for an Eclipse application assembler to create program groups and program shortcuts during install and remove the created program groups and shortcuts during un-install.

SUMMARY OF THE INVENTION

The shortcomings of the prior art are overcome and additional advantages are provided through the provision of a system and method which allows an Eclipse application assembler to have their Eclipse feature create program groups and program shortcuts. The number and type of shortcuts created is controlled via properties files included in the Eclipse feature containing the Install handler.

In accordance with one embodiment of the present invention a method for an Eclipse feature to create program groups and shortcuts is provided. The method includes registering a global install handler and creating a properties file. The method also includes specifying and installing at least one feature associated with the registered global install handler. Installing the feature invokes the global install handler to creating at least one shortcut and/or at least one program group associated with the properties file.

The invention is also directed towards a system for allowing an Eclipse feature to create program groups and shortcuts. The system includes a global install handler configured as:

com.ibm.rep.provisioning.install-
handler.DesktopOperationsInstallHandler;

and a properties file associated with the global install handler. The system also includes a links directory containing the properties file.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides a program storage device readable by a machine, tangibly embodying a program of instructions executable by the machine to perform a method for creating program groups and shortcuts is provided. The program of instructions include registering at least a global install handler configured as:
    com.ibm.rcp.provisioning.install-
        handler.DesktopOperationsInstallHandler.

The instructions also include creating a properties file in a links directory and specifying a feature associated with the registered global install handler. The program further includes installing the feature and determining if an older version of the feature is installed. If an older version is installed the program of instructions include removing the program group associated with the older version and installing the new program group. The program of instructions then creates a shortcut and/or a program group associated with the properties file.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates logic specifying the use of the Desktop Operations Install Handler in the present invention as shown in FIG. 2; and FIG. 4 illustrates logic creating a series of properties files in the present invention as shown in FIG. 2.

DETAILED DESCRIPTION OF THE INVENTION

Figure 1:
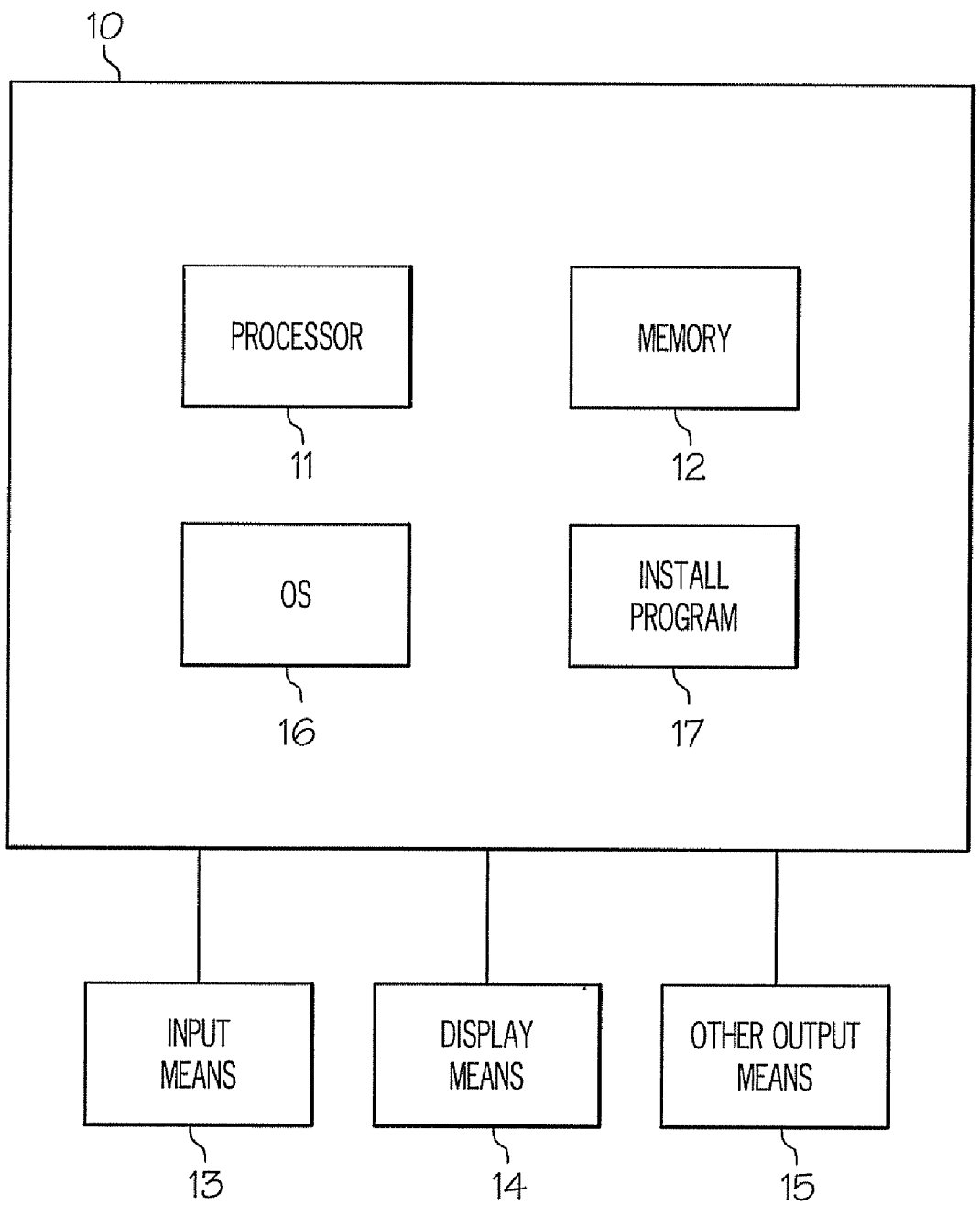
FIG. 1 is a block diagram illustrating a software and hardware environment in which preferred embodiments of the present invention are implemented.

With reference to FIG. 1, a block diagram of a data processing system 10, (i.e., computer system), in which an embodiment of the present invention may be implemented, is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc.

Memory 12 includes volatile or nonvolatile storage and/or any combination thereof. Volatile memory may be any suitable volatile memory devices known in the art, (e.g., RAM, DRAM, SRAM, etc). Nonvolatile memory may include storage space (e.g., use of hard disk drives) for programs, whether or not the programs are being executed.

The programs in memory 12 include an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

Figure 2:
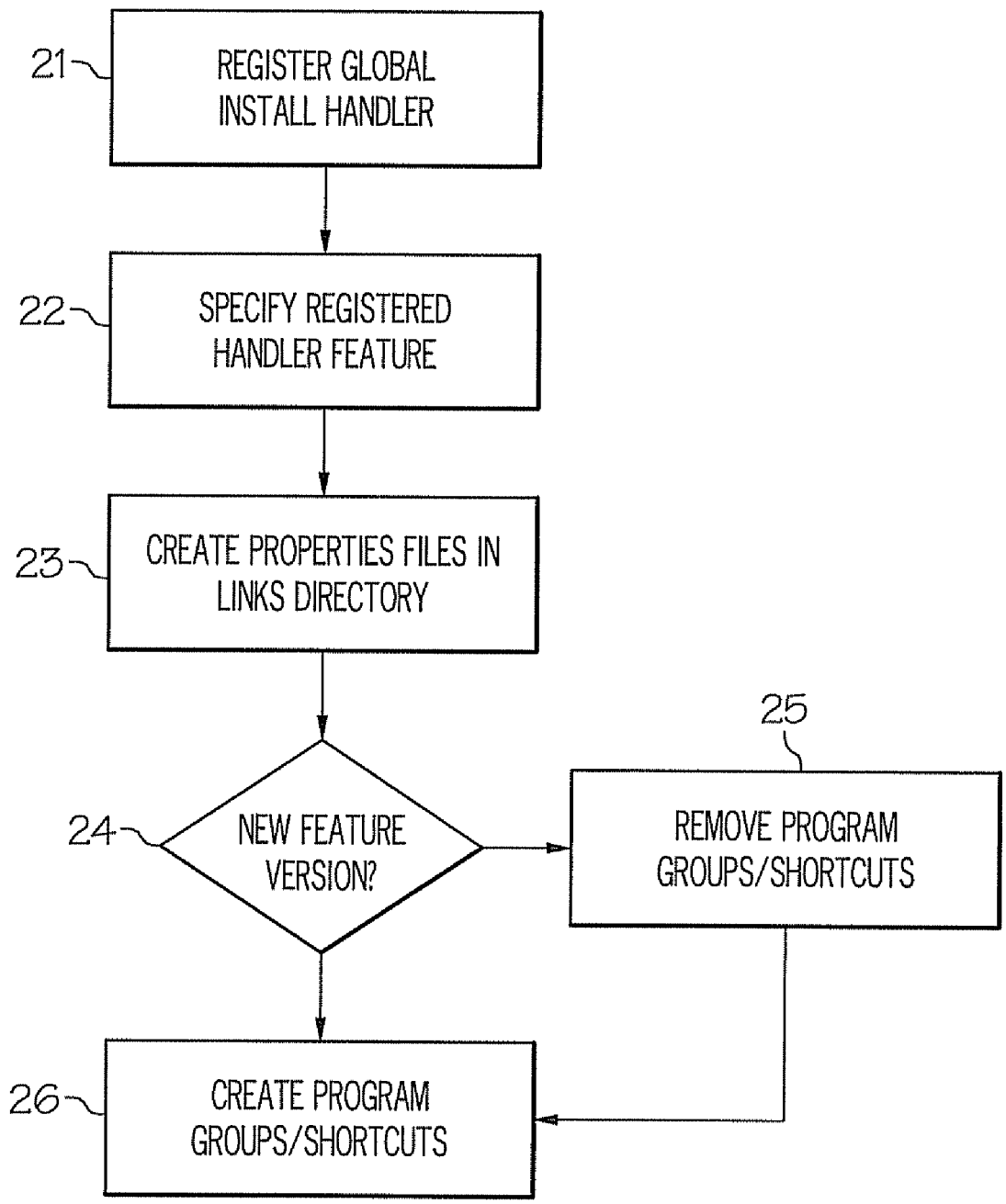
FIG. 2 is a flowchart illustrating one method of the features of the present invention shown in FIG. 1.

Referring to FIG. 2, the instruction:
    com.ibm.rcp.provisioning.install-
        handler.DesktopOperationsInstallHandler is registered 21 as a global install handler in the IR4D runtime. A consumer of the install handler specifies 22 the use of the DesktopOperationsInstallHandler in their feature. (See FIG. 3)

The consumer creates 23 a series of properties files in a directory named "links" relative from the root of the feature. (See FIG. 4.) The properties files provide the data required to drive the install handler.

When a feature which uses the install handler is installed/provisioned into the IR4D runtime, the install handler is invoked and the properties files are read from the feature links directory, validated for minimum set of values, and then the program groups and program shortcuts are created 26.

When a newer version of a feature using the install handler is installed 24 into the runtime, the previously created program groups, shortcuts are removed 25 and new ones are created 26 using the properties files in the newer version of the feature.

The install handler referred to above, may also support removal of arbitrary program groups, shortcuts (created via some other mean) via the use of a "remove" folder in the feature, containing properties files which describe which program groups and shortcuts should be removed.

The exemplary embodiment shown in FIGS. 1-3 are provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation is within the sprit and scope of the present invention. The computer system and parts thereof depicted in the figures are provided solely as examples for the purposes of explanation are not intended to necessarily imply architectural limitations.

Embodiments of the invention may include a) an installer tool kit, including a system, method, and program, that enables the creation of install programs with program groups and program shortcuts creation capability, b) an install program that can be used for multiple platforms to install an application program on a specific operating system; (i.e., the same install program can be used to install a similar application program on different operating systems), c) a method for carrying out the functions of the install program, d) an uninstaller, including a system, method, and program, that enables the removal of program groups and program shortcuts created during the install process, and e) a computer system running the install program on a specific operating system for installing an application program.

Other more general embodiments may include a) any tool kit for enabling the creation of programs that are capable of running on more than one operating system, b) any program that is enabled for multiple platforms, c) methods carried out by cross platform programs, and d) a computer system running a program that is enabled for multiple platforms.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for an Eclipse feature to create program groups and shortcuts, the method comprising:
   registering at least one global install handler;
   creating at least one properties file;
   specifying at least one feature associated with the registered global install handler;
   installing the at least one feature;
   creating at least one shortcut associated with the at least one properties file;
   determining an older version of the at least one feature is installed;
   removing the at least one program group associated with the older version of the at least one feature; and
   installing a second program group.

2. A method as in claim 1 wherein creating at least one shortcut further comprises creating at least one program group associated with the at least one feature.

3. A method as in claim 1 wherein creating the at least one shortcut further comprises invoking the at least one global install handler.

4. A method as in claim 1 wherein creating at least one properties file further comprises locating the at least one properties file in a links directory.

* * * * *